US011125263B2

(12) United States Patent
Dobbin et al.

(10) Patent No.: US 11,125,263 B2
(45) Date of Patent: Sep. 21, 2021

(54) CAP WITH SEALANT FLOW PATH

(71) Applicant: AIRBUS OPERATIONS LIMITED, Bristol (GB)

(72) Inventors: Richard Dobbin, Bristol (GB); Julien Legrand, Bristol (GB); Julien Assemat, Bristol (GB); Thomas Monaghan, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 227 days.

(21) Appl. No.: 16/366,182

(22) Filed: Mar. 27, 2019

(65) Prior Publication Data
US 2019/0301514 A1    Oct. 3, 2019

(30) Foreign Application Priority Data

Mar. 28, 2018 (GB) ...................................... 1804985

(51) Int. Cl.
*F16B 33/00* (2006.01)
*F16B 37/14* (2006.01)
*B64D 45/02* (2006.01)

(52) U.S. Cl.
CPC ............ *F16B 33/004* (2013.01); *F16B 37/14* (2013.01); *B64D 45/02* (2013.01); *F16B 33/00* (2013.01)

(58) Field of Classification Search
CPC ...... F16B 33/004; F16B 37/14; F16B 41/005; F16B 33/00; Y10S 411/91; B64D 45/02
USPC ............................ 411/372.5, 372.6, 373, 377
See application file for complete search history.

(56) References Cited

U.S. PATENT DOCUMENTS

| | | | | |
|---|---|---|---|---|
| 3,241,427 A | * | 3/1966 | Bosler .................... | F16B 37/14 411/368 |
| 3,548,704 A | * | 12/1970 | Kutryk .................... | F16B 39/08 411/373 |
| 4,400,123 A | * | 8/1983 | Dunegan ................. | F16B 37/14 116/270 |
| 4,659,273 A | * | 4/1987 | Dudley .................. | F16B 41/005 411/373 |

(Continued)

FOREIGN PATENT DOCUMENTS

| | | |
|---|---|---|
| GB | 2520774 | 6/2015 |
| GB | 2 557 961 | 6/2018 |

(Continued)

OTHER PUBLICATIONS

Extended European Search Report for EP Application No. 19164102.6, 12 pages, dated Jun. 4, 2019.

(Continued)

*Primary Examiner* — Roberta S Delisle
(74) *Attorney, Agent, or Firm* — Nixon & Vanderhye P.C.

(57) ABSTRACT

A cap for forming a sealed cavity around an end of a fastener is disclosed. The cap has a cap body with an annular base terminating at a base rim which surrounds an opening into a central cavity. The cap also has an annular skirt providing an annular pocket between the skirt and the base. An inlet hole is provided in the skirt which is in fluid communication with the annular pocket. A protuberance protrudes in the annular pocket and faces the inlet hole to promote a flow of sealant injected through the inlet hole to flow annularly around the annular pocket.

19 Claims, 5 Drawing Sheets

(56) References Cited

U.S. PATENT DOCUMENTS

| | | | | |
|---|---|---|---|---|
| 5,082,409 A * | 1/1992 | Bias | ............... | F16B 37/14 |
| | | | | 411/372.5 |
| 6,086,972 A * | 7/2000 | Rayburn | ............... | B25B 23/00 |
| | | | | 411/373 |
| 6,238,158 B1 * | 5/2001 | Clements | ............... | F16B 37/14 |
| | | | | 411/372.6 |
| 8,894,338 B2 * | 11/2014 | Dobbin | ............... | F16B 39/225 |
| | | | | 411/373 |
| 9,228,604 B2 * | 1/2016 | Dobbin | ............... | B64C 1/12 |
| 9,416,811 B2 * | 8/2016 | Dobbin | ............... | B64D 45/02 |
| 9,506,493 B2 * | 11/2016 | Dobbin | ............... | B64C 1/12 |
| 9,599,141 B2 * | 3/2017 | Dobbin | ............... | F16B 37/14 |
| 10,240,628 B2 * | 3/2019 | Dobbin | ............... | F16B 37/14 |
| 10,774,869 B2 * | 9/2020 | Dobbin | ............... | B64D 45/02 |
| 2015/0300397 A1 * | 10/2015 | Dobbin | ............... | B64D 45/02 |
| | | | | 411/372.6 |

FOREIGN PATENT DOCUMENTS

| | | |
|---|---|---|
| WO | 2012/107741 | 8/2012 |
| WO | 2013/178985 | 12/2013 |
| WO | 2014/170672 | 10/2014 |
| WO | 2014/170674 | 10/2014 |
| WO | 2015/015153 | 2/2015 |
| WO | 2015/025130 | 2/2015 |
| WO | 2015/121624 | 8/2015 |

OTHER PUBLICATIONS

Search Report for GB1804985.8 dated Jul. 30, 2018, 5 pages.
Search Report for GB1804985.8 dated Sep. 28, 2018, 2 pages.

* cited by examiner

US 11,125,263 B2

CAP WITH SEALANT FLOW PATH

CROSS RELATED APPLICATION

This application claims priority to United Kingdom (GB) patent application 1804985.8, filed Mar. 28, 2018, the entire contents of which are hereby incorporated by reference.

FIELD OF THE INVENTION

The present invention relates to a cap for forming a sealed cavity around an end of a fastener. In particular, but not exclusively, the present invention relates to a spark containment cap. The present invention also relates to a joint, a method of assembling a joint, and an aircraft comprising at least one of the cap and the joint.

BACKGROUND OF THE INVENTION

Large passenger aircraft are typically struck by lightning once or twice a year, each lightning bolt striking with up to 200,000 amps of electrical current that seeks the path of least electrical resistance. Many modern passenger aircraft have exterior surfaces made from composite materials which have a very high electrical resistance. There is therefore a high probability of lightening attachment at any of the many metallic fasteners in the exterior surface, which have a much lower electrical resistance. In the wing, some of these fasteners pass through the outer wing skin into the fuel tank.

FIG. 1 is a side view of part of a fastener assembly passing through a panel 1, which may be a composite or metallic panel. The assembly comprises a fastener comprising an externally threaded bolt 2, an internally threaded nut 3, and a washer 4. In the event of a lightning strike hitting the panel 1 and attaching to the fastener, sparking, plasma or outgassing may occur at the locations indicated by reference 5 in FIG. 1.

WO 2013/178985, WO 2014/170672 and WO 2014/170674 disclose known injectable nut caps for forming a sealed cavity around an end of a fastener. Such caps include an inner cap body which surrounds an opening into a central cavity and an outer cap body fitted over the inner cap body. A flow space is defined between the outer cap body and the inner cap body. Sealing material is injected through an inlet into the flow space, with air and excess sealing material flowing from a circumferentially extending gap provided between the outer cap rim and the structure. The sealing material forms a bead which seals the central cavity and adheres the cap to a structure.

Another injectable nut cap is known from WO 2015/025130. An inner cap body is provided which surrounds an opening into a central cavity. An annular skirt provides an annular pocket between the skirt and the inner cap body. Sealing material is injected into the annular pocket through an inlet, with air and excess sealing material flowing from an outlet on an opposing side of the skirt.

SUMMARY OF THE INVENTION

According to an aspect of the invention, there is provided a cap for forming a sealed cavity around an end of a fastener, the cap comprising a cap body with an annular base terminating at a base rim which surrounds an opening into a central cavity; an annular skirt providing an annular pocket between the skirt and the base; an inlet hole in the skirt, wherein the inlet hole is in fluid communication with the annular pocket; and a protuberance protruding in the annular pocket and facing the inlet hole to promote a flow of sealant injected through the inlet hole to flow annularly around the annular pocket.

With such an arrangement, it is possible to guide sealant flow in the pocket to flow annularly and so promote a sealant flow around the pocket. By promoting a flow of sealant around the pocket it is possible to limit an upward force on the cap as a result of sealant flowing downwardly in the pocket.

The protuberance may extend from the annular base towards the inlet hole in the skirt.

As such, a flow guide may be easily formed in the pocket.

The protuberance may have a leading edge configured to intersect the flow of sealant injected through the inlet hole.

Such a configuration aids the flow of sealant around the annular pocket in two directions. Therefore, the flow of sealant in the pocket may be better controlled.

The leading edge may be configured to bisect the flow of sealant injected through the inlet hole.

As such, the flow of sealant flowing into the pocket may be straightforwardly divided into two flow paths. This helps to provide an even distribution of sealant about the pocket.

The annular skirt may surround a cap axis. The inlet hole may have a centre axis lying on a radially extending plane from the cap axis. The leading edge may be on the radially extending plane.

The leading edge may extend to the inlet hole.

The protuberance may comprise two guide faces extending from the leading edge to the annular base.

A lower end of the protuberance may comprise a chamfer extending from the leading edge to proximal the base rim.

With such a configuration, an upwardly distending force, that is away from a surface from which the fastener protrudes, may be limited. This helps to limit the cap being displaced away from the surface during assembly.

The chamfer may be below the inlet hole.

The cap may comprise an outlet in the skirt. The outlet may be in fluid communication with the annular pocket.

The inlet hole and outlet may be positioned on opposite sides of the cap axis.

The annular skirt may extend from the cap body and may terminate at a skirt rim.

The outlet may comprise an outlet hole in the skirt or a recess in the skirt rim.

According to a further aspect of the present invention, there is provided a cap for forming a sealed cavity around an end of a fastener, the cap comprising: a cap body with an annular base terminating at a base rim which surrounds an opening into a central cavity and lies in a base rim plane around all or a majority of its circumference; an annular skirt providing an annular pocket between the skirt and the base, the annular skirt extending from the cap body and terminating at a skirt rim; an inlet hole in the skirt, wherein the inlet hole is in fluid communication with the pocket to permit a flow of sealing material through the skirt via the inlet hole into the pocket; and an outlet in the skirt, wherein the outlet is in fluid communication with the pocket and arranged to enable air to escape the annular pocket through the skirt via the outlet as the sealing material flows from the inlet hole into the pocket; wherein the skirt is spaced from the base rim plane around all or a majority of a circumference of the skirt so that there is an offset from the base rim plane to define a gap between the skirt rim and the base rim plane.

With this configuration, it is possible to help ensure abutment of the base rim against a surface of a structure from which the fastener protrudes. By offsetting the skirt rim from the plane of the base rim, it is possible to help prevent the base rim from being spaced from the surface due to abutment of the skirt rim, and so restrict any sealant leakage or air pressure build-up in the central cavity. As such, a limited amount of leakage is allowed from the annular pocket between the skirt rim and the structure to aid prevention of leakage from the annular pocket between the base rim and the structure.

The phrase "at least a majority of a circumference" relates to all or a majority of a circumference.

The offset may be between 0.05 mm and 0.35 mm. With such an arrangement it is possible to allow for air leakage from the annular pocket between the skirt rim and the structure whilst restricting sealant material leakage due to the viscosity of the sealant material. As such, the sealant material is promoted to flow annularly around the pocket to the outlet to provide a consistent seal.

The skirt may be spaced from the base rim plane around the full circumference of the skirt.

The skirt rim may lie parallel to the base rim plane around at least a majority of its circumference.

The skirt terminating at the skirt rim and the cap body may be integrally formed from the same material. The cap may be a one-piece part.

The annular skirt may surround a cap axis. The inlet hole and outlet may be positioned on opposite sides of the cap axis.

The outlet may comprise an outlet hole in the skirt or a recess in the skirt rim.

The outlet may comprise the recess in the skirt rim and the length of the skirt is uniform around the circumference of the skirt except for the recess.

The base rim may lie in the base rim plane around the full circumference of the skirt.

According to a further aspect of the invention, there is provided a joint comprising a structure; an end of a fastener protruding from the structure; and a cap as described above forming a sealed cavity around the end of the fastener, the cap comprising a cured sealing material in the annular pocket which secures the cap to the structure.

When the skirt is spaced from the base rim plane around all or a majority of the circumference of the skirt so that there is an offset from the base rim plane to define a gap between the skirt rim and the base rim plane; the offset defining the gap and the sealing material may be selected to restrict uncured sealing material leakage between the skirt rim and the structure.

The skirt rim may be spaced from the structure around its full circumference.

According to a further aspect of the invention, there is provided a method of assembling the joint as described above, the method comprising fitting the cap over the end of the fastener; and injecting sealing material through the skirt via the inlet hole into the annular pocket.

According to a further aspect of the invention, there is provided at least one of an aircraft assembly and an aircraft including at least one of a cap and a joint as described above.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
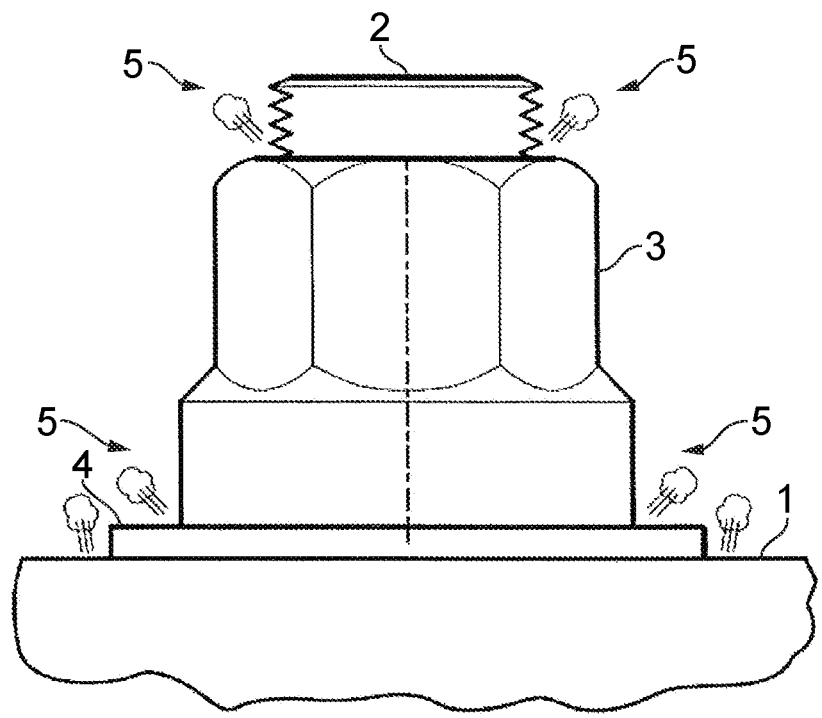
FIG. 1 shows a side view of part of a prior art fastener assembly protruding from a structure.
Figure 2:
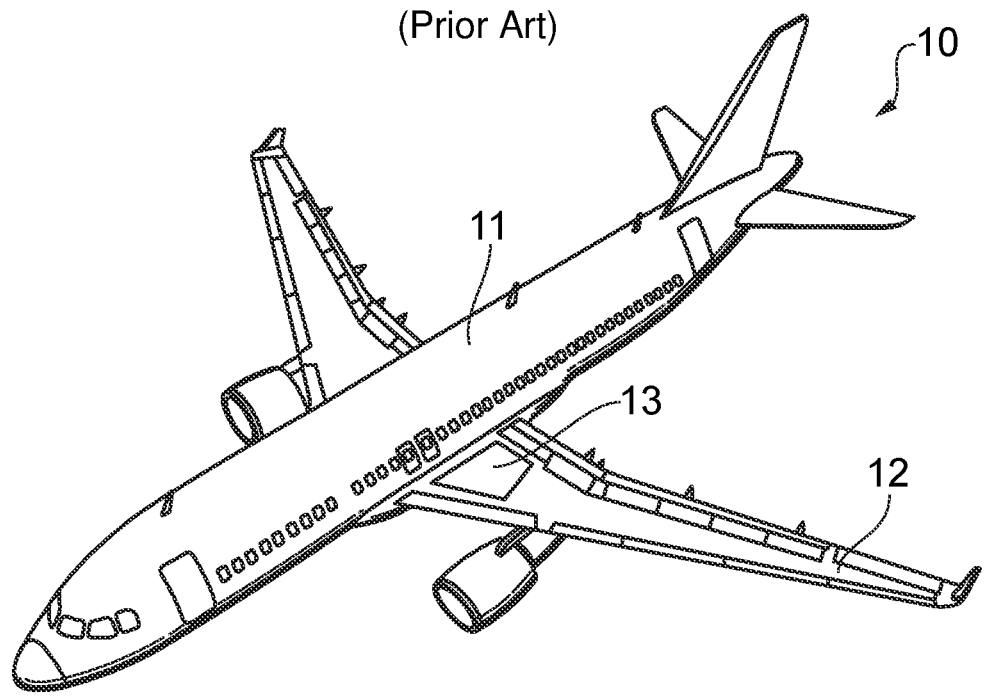
FIG. 2 shows a perspective view of an aircraft.
Figure 3:
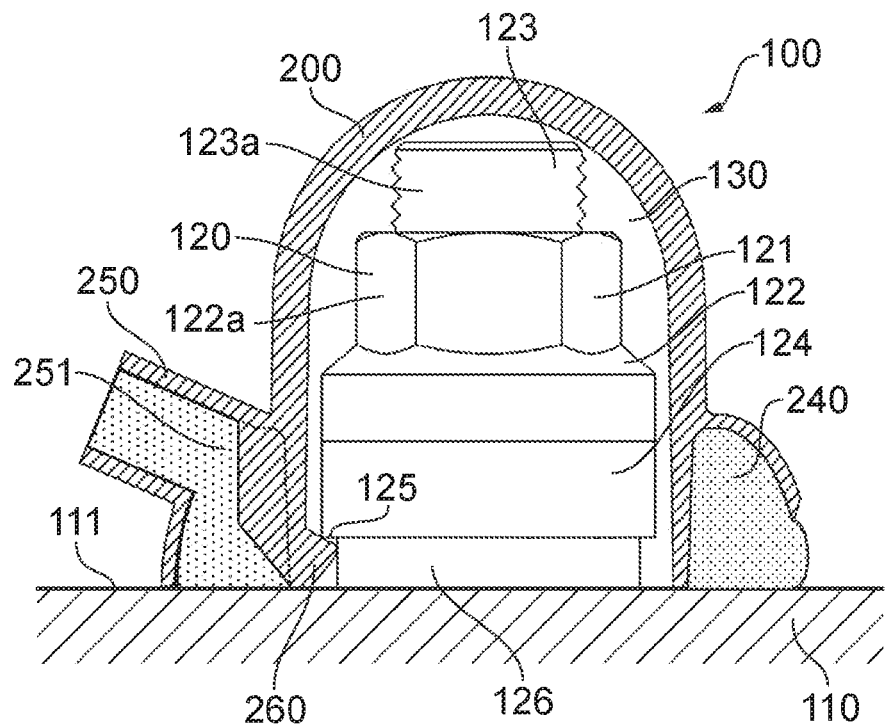
FIG. 3 shows a partial cross-sectional front view of a joint comprising a fastener and a cap following injection with a sealant.

An aircraft 10 is shown in FIG. 2. The aircraft 10 includes a fuselage 11. Two wings 12 extend from the fuselage 11. It will be appreciated that the fuselage 11 and wings 12 may take a variety of different planform shapes and profiles depending on the particular application. Fuel tanks 13 are formed in the fuselage 11 and wings 12. One such fuel tank 13 is shown schematically in FIG. 2. The fuel tanks 13 are formed by a structure or structures forming part of the aircraft 10.

FIGS. 3 to 8 show a joint 100 in stages of installation. The joint 100 is shown assembled in FIG. 3. The joint 100 comprises a structure 110 such as an aircraft skin panel. The structure 110 has a planar surface 111. A fastener 120 extends through the structure 110. The structure 110 in this embodiment is a composite aircraft structural component, but may be a hybrid composite-metallic or other component.

An end 121 of the fastener 120 protrudes from the structure 110. The fastener 120 comprises a first fastening member 122 and a second fastening member 123. The first and second fastening members 122, 123 are engageable with each other.

The second fastening member 123 comprises an axially extending shaft 123a protruding from the structure 110. The first fastening member 122 comprises a nut 122a screwed onto the shaft 123a and a washer 124 between the nut 122a and the structure 110. The nut 122a is threadingly engageable on the shaft 123a. The fastener 120 defines a longitudinal axis.

The washer 124 is stepped. The washer 124 defines a step 125 of the fastener 120. In the Figures the step 125 is formed by a diametrically recessed section 126 in an outer side of the washer 124. In an alternative embodiment, the washer 124 comprises first and second washer parts in which the second washer part has a smaller diameter than the first washer part. The step may be formed by a groove in the washer 124 (not shown). In embodiments, the step is defined by the washer having a smaller outer diameter than the nut. In embodiments, the step is formed in the nut.

A cap 200 encloses the end 121 of the fastener 120 and will be described in detail with reference to FIGS. 3 to 10. The cap 200 has a cap body 201 with a domed outboard (upper) part 202 and a substantially cylindrical base 210. The base 210 is annular. The base 210 terminates at a rim 211 which surrounds an opening 212 into a central cavity 130. The rim 211 lies in a plane 214 so it can intimately engage with the planar surface 111 of the structure 110 around its full circumference when the cap 200 is fitted over the end 121 of the fastener 120 as shown.

The cap body 201 is formed with three axially extending ribs 215 (refer in particular to FIG. 5) which project inwardly into the central cavity 130. The ribs 215 protrude from an inner surface 213 of the base 210. In embodiments, the ribs 215 abut the cylindrical outer faces of the washer 124 as an interference fit.

Teeth 260 are formed at the lower, inboard, end of the cap body 201. The teeth 260 are proximate the base rim 211. In the present embodiment the cap 200 is formed with three teeth 260, however the number of teeth may differ. For example, in FIG. 9 an alternative cap 200 is shown with five teeth 260. The teeth 260 are dispersed equidistantly around the base 210. The teeth 260 protrude from the ribs 215. Alternatively, or additionally, one or more of the teeth 260 protrudes from the inner surface 213 and the ribs 215 are omitted. The teeth 260 locate against the step 125 to bias the cap 200 against the surface of the structure during assembly.

An annular skirt 220 extends from an outboard (upper) end 221 where it meets the cap body 210 to an inboard (lower) skirt rim 222. The skirt has a flared elliptical outboard (upper) part 223 which extends away from the cap body 210, and a substantially cylindrical inboard (lower) part 224 which extends parallel with a cap axis 230. The skirt rim 222 represents the inboard (lower) extent of the skirt 220.

An annular pocket 240 is provided between the skirt 220 and the base 210. The pocket 240 extends from a closed outboard end 241 at the outboard end 221 of the skirt 220, to an open inboard end 242 at the skirt rim 222. Due to the flared shape of the outboard part 223 of the skirt 220, the pocket 240 has a radial width which increases as it extends from its outboard end 241 to its inboard end 242.

The skirt 220 has a tubular projection 250 which projects outwardly from the skirt and provides an injection channel leading to a circular inlet hole 251. The tubular projection 250 is arranged to interconnect with a nozzle of a sealing material injection device (not shown) to provide a flow of sealing material through the skirt 220 via the inlet hole 251 into the pocket 240. In this case they are interconnected by receiving the projection 250 within the sealing material injection device nozzle, although the opposite arrangement is also possible.

The inlet hole 251 opens to the pocket 240 through a wall 220a of the skirt 220. The inlet hole 251 faces the annular base 210 of the cap body 201. A protuberance 300 is disposed in the pocket 240. The protuberance 300 acts as a sealant material guide. The protuberance 300 protrudes from the base 210 facing the inlet hole 251. The protuberance 300 protrudes in the pocket 240. The protuberance 300 is integrally formed.

Figure 7:
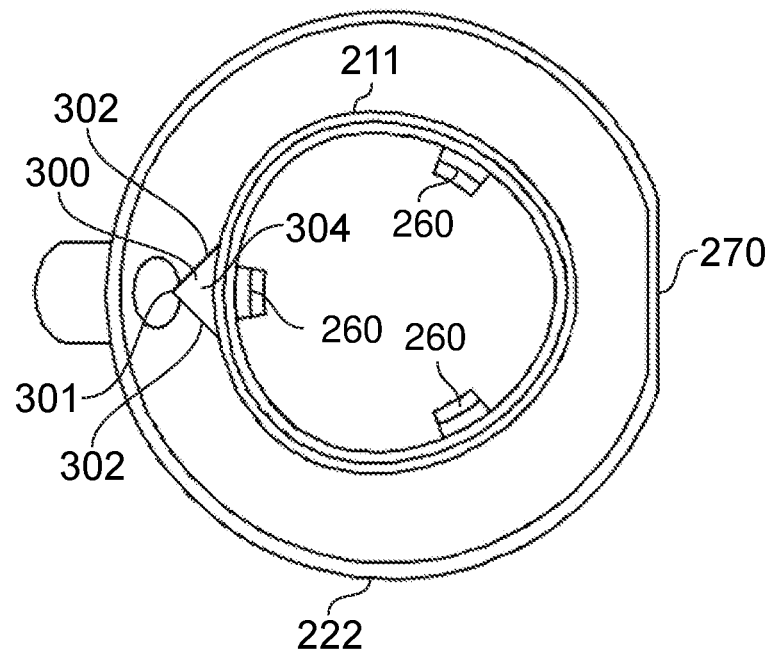
FIG. 7 shows a plan view from below of the cap of FIG. 6.
Figure 8:
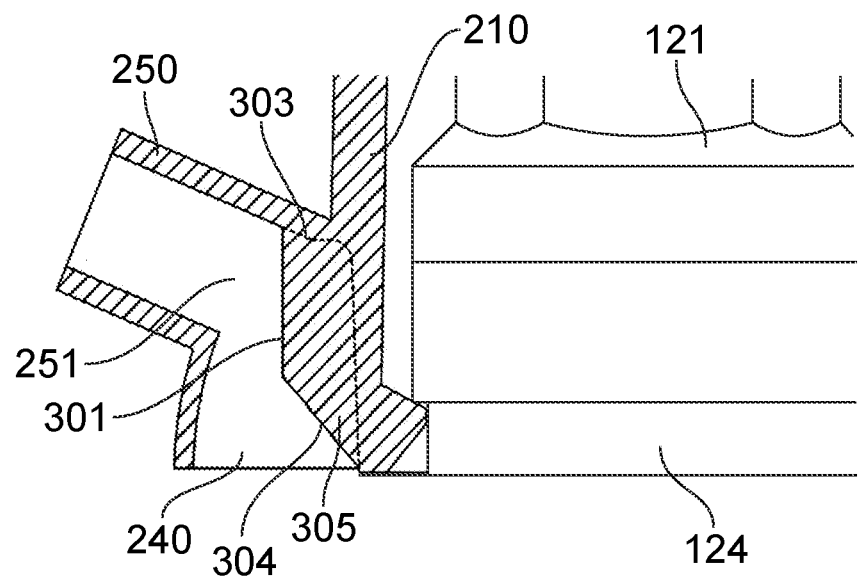
FIG. 8 shows a partial cross-sectional view of part of the joint of FIG. 4.
Figure 9:
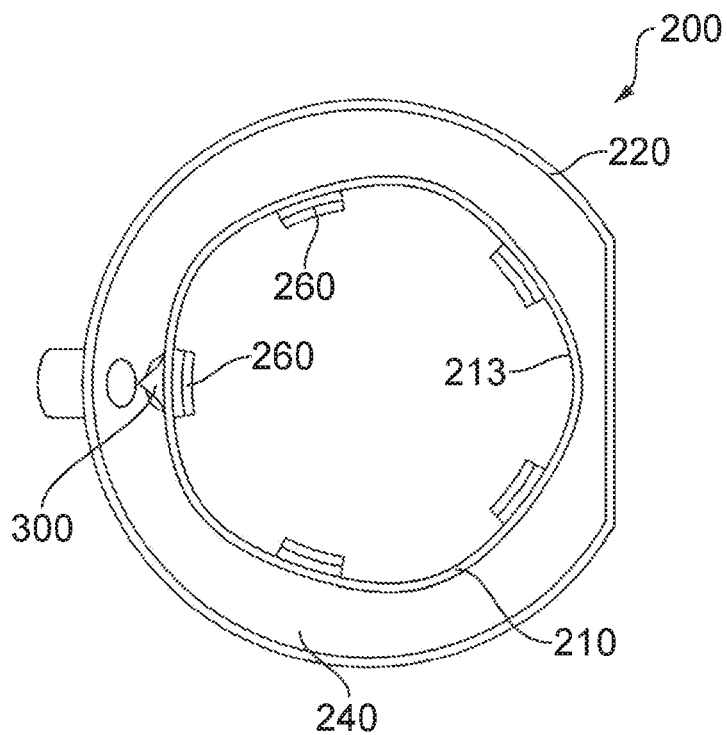
FIG. 9 shows a plan view from below of another cap.
Figure 10:
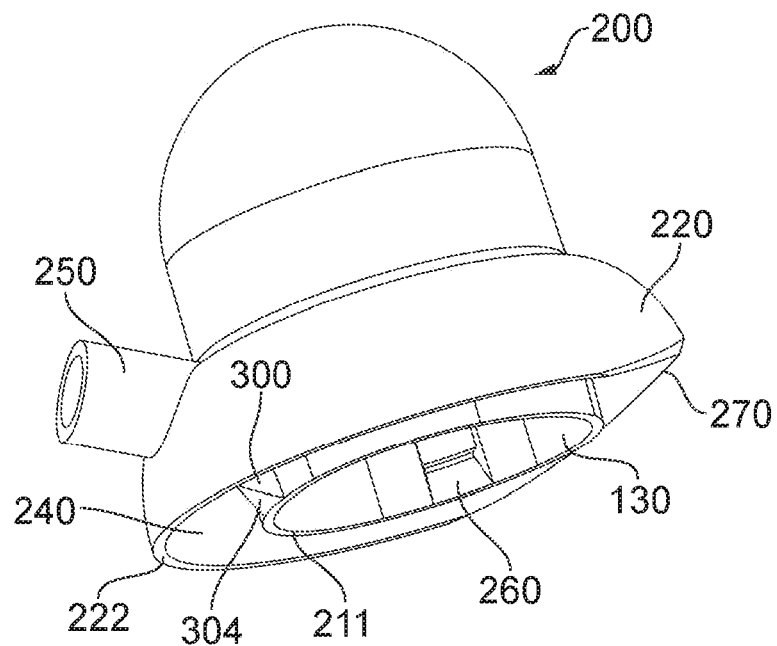
FIG. 10 shows a perspective view of the cap of FIG. 3.

Referring in particular to FIGS. 7 and 8, the protuberance 300 is wedge-shaped. A leading edge 301 of the protuberance 300 intersects a flow of sealant injected through the inlet hole 251. A leading edge 301 of the protuberance 300 is disposed toward the inlet hole 251. The protuberance 300 comprises the leading edge 301 and two guide faces 302 extending from the leading edge 301 to the surface of the base 210. The guide faces 302 extend substantially perpendicular to each other, however it will be understood that the relative angles of the guide faces 302 may differ. The guide faces 302 are planar. Alternatively the guide faces 302 are arcuate.

Figure 5:
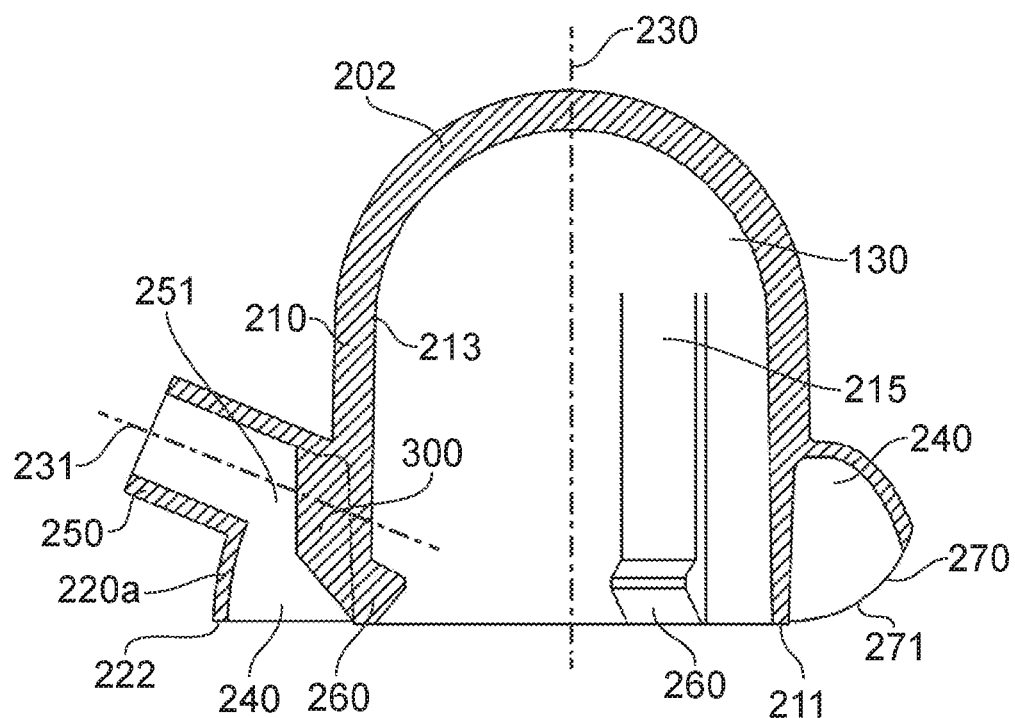
FIG. 5 shows a cross-sectional front view of the cap of FIGS. 3 and 4.
Figure 6:
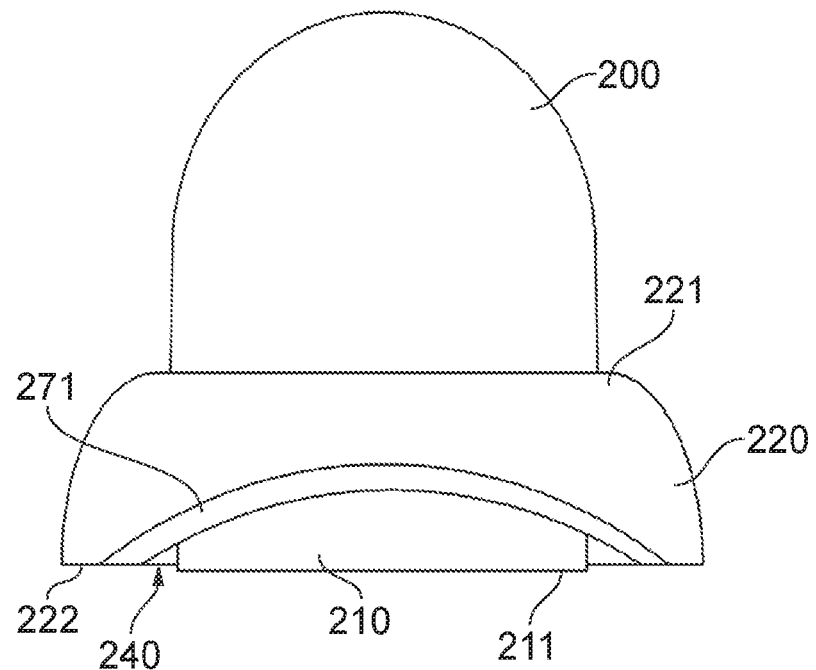
FIG. 6 shows a side view of the cap of FIGS. 3-5.

The inlet hole 251 has a centre axis 231 (FIG. 5). The centre axis 231 of the inlet hole 251 lies on a plane radially extending from the cap axis 230. The leading edge 301 is on the radially extending plane. The protuberance 300 is symmetrical. The protuberance 300 is symmetrical about the radially extending plane. The leading edge 301 extends to the inlet hole 251. An outboard (upper) end 303 of the protuberance 300 extends through the inlet hole 251 (refer to FIG. 8). In another embodiment, the protuberance 300 extends to or is spaced from the inlet hole 251.

The leading edge 301 bisects the flow of sealant injected through the inlet hole 251. As such, the sealant flowing into the pocket 240 is divided into two equal flow portions. This helps to ensure an even distribution of sealant around the annular pocket 240.

When sealant is injected through the inlet hole 251, the sealant contacts the protuberance 300. The protuberance 300 promotes an annular flow of sealant around the pocket 240. By promoting the flow in an annular direction, an inboard flow direction is restricted to help limit the injection of sealant from causing the nutcap to tend away from the structure in the region of the inlet hole 251, in particularly due to the inclined angle of the tubular projection 250.

One of the teeth 260 is disposed adjacent to the protuberance 300. By providing the protuberance 300 and adjacent tooth 260 it is further possible to restrict movement of the cap 200 away from the structure surface 111.

The protuberance 300 has a chamfer 304. The chamfer 304 is at an inboard (lower) end 305 of the protuberance 300. The chamfer 304 extends from the leading edge 301 to proximal the base rim 211. The chamfer 304 is inclined downwardly from the leading edge 301 towards the base rim 211. The chamfer 304 is a planar surface. A leading apex of the chamfer 304 at the leading edge 301 is below the inlet hole 251.

All parts of the cap are integrally formed by injection moulding or similar. A suitable material is a nylon material, such as Nylon PA66 or Nylon PA12.

A suitable sealant material is a polythioether sealant such as PPG PR-2001B2 or a polysulphide sealant such as Naftoseal (R) MC238B, MC238A, or MC780 available from Chemetall Group.

The skirt 220 also has an outlet 270 on an opposite side of the cap axis 230 to the inlet hole 251. The skirt 220 terminates in the skirt rim 222 which surrounds the pocket 240 and lies in a plane around a majority of its circumference except where it is formed with an outlet recess 271 shown most clearly in FIG. 5. The outlet recess 271 extends around about ⅛th of the circumference of the cap.

The outlet 270 is in fluid communication with the pocket 240 and is arranged to enable air to escape the pocket 240 through the skirt via the outlet 270 as the sealing material flows from the inlet hole 251 into the pocket 240. When the pocket 240 is full, the pressure in the pocket 240 increases until it forces sealing material to escape the pocket 240 through the skirt 220 via the outlet 270. When the flow of sealing material out of the outlet 270 is visually observed, the flow of sealing material into the inlet hole 251 is stopped. Alternatively, or additionally, the outlet includes an outlet hole formed through the skirt 220.

The sealing material is then allowed to cure, leaving a cured sealing material 140 (shown in FIG. 3) in the pocket 240 which secures the cap 200 to the structure 110 and forms a seal around the cavity 130. This seal prevents the ingress of water or other contaminants into the cavity 130, and also prevents plasma or other out-gassing products from exiting the cavity 130 in the event of a lightning strike. Cured sealing material 140 also fills the injection channel, the inlet hole 251 and the outlet 270.

As described above, the base rim 211 lies in the plane 214. The base rim 211 lying in the base rim plane 214 helps to ensure that the base rim 211 is able to intimately engage with the planar surface 111 of the structure 110 around its full circumference when the cap 200 is fitted over the end 121 of the fastener 120.

The skirt rim 222 lies in a plane 225. The skirt rim plane 225 is not coplanar with the base rim plane 214. The skirt rim 222 of the skirt 220 is spaced from the base rim plane around its full circumference. As such, there is an offset from the base rim plane 214. The offset defines a gap between the skirt rim 222 and the base rim plane 214.

When the outlet recess 271 forms the recess 270 in the skirt 220, the length of the skirt 220 is uniform around the circumference of the skirt 220 except for the recess 271. The skirt rim 222 lies in the skirt rim plane 225 around the full circumference of the skirt 220, except for the recess 271. The skirt rim plane 222 lies parallel to the base rim plane 214.

Figure 4:
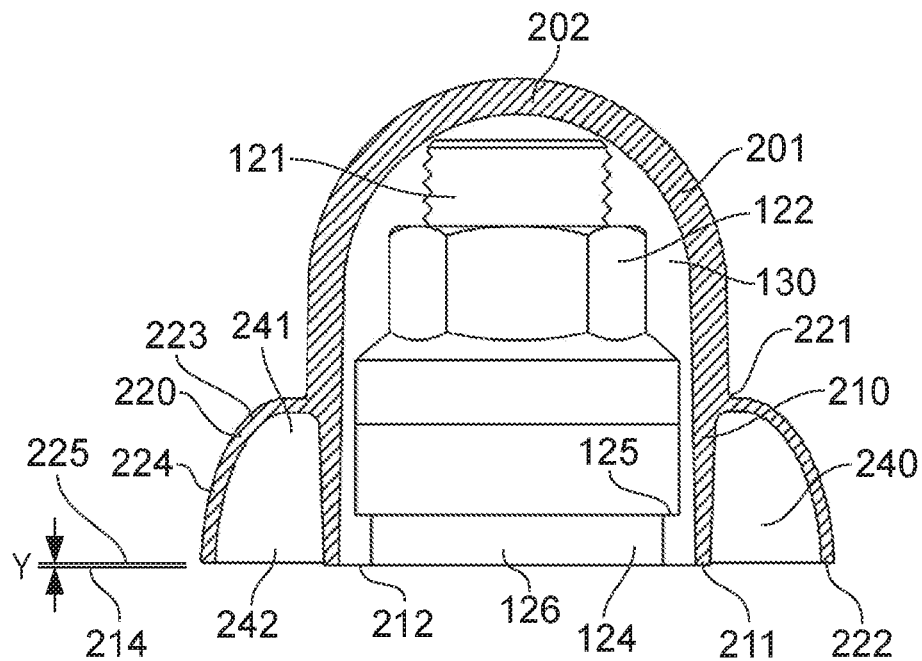
FIG. 4 shows a partial cross-sectional side view of the joint of FIG. 3 comprising the fastener and the cap prior to injection with a sealant.

The offset, represented by dimension Y in FIG. 4, of the skirt rim 222 from the base rim plane 214 around at least the majority of the circumference of the skirt 220 is in the range of 0.0 5 mm and 0.35 mm. Optionally, the offset is between 0.1 mm and 0.3 mm. It will be understood that the offset may be determined based on the viscosity of the sealant material to be used with the cap 200.

When the cap 200 is fitted over the end 121 of the fastener 120, the rim 211 lies in its plane so it can intimately engage with the planar surface 111 of the structure 110 around its full circumference. This helps prevent leakage of air and sealant into the inner cavity 130. The offset Y of the skirt rim 122 from the plane of the base rim 211 helps to ensure that the skirt 120 does not come into contact with the planar surface 111 of the structure 110. Therefore, any tolerance issues or smoothness issues which may lead to a raised part of the planar surface 111 do not contact the skirt 120. As such, the skirt does not cause the cap 200 to be lifted at any point around its circumference which could affect the engagement of the base rim 211, and lead to leakage of air and sealant into the inner cavity 130. The applicant has surprisingly found that by providing an offset of the skirt rim 211 together with an inlet and an outlet to the pocket 240 that it is possible to provide for adequate sealant flow around the annular pocket 240 from the inlet hole 251 to the outlet 270 despite the presence of a circumferentially extending gap around the skirt 210. As such, prevention of leakage into the inner cavity 130 may be enhanced without causing a potential detrimental effect on the adherence of the cap to the structure.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A cap for forming a sealed cavity around an end of a fastener, the cap comprising:
   a cap body with an annular base terminating at a base rim which surrounds an opening into a central cavity;
   an annular skirt providing an annular pocket between the skirt and the base, wherein the annular skirt extends from an outboard end where it meets the cap body to an inboard skirt rim;
   an inlet hole in the skirt, wherein the inlet hole is in fluid communication with the annular pocket; and
   a protuberance protruding in the annular pocket and facing the inlet hole to promote a flow of sealant injected through the inlet hole to flow annularly around the annular pocket.

2. The cap of claim 1, wherein the protuberance extends from the annular base towards the inlet hole in the skirt.

3. The cap of claim 2, wherein the protuberance has a leading edge configured to intersect the flow of sealant injected through the inlet hole.

4. The cap of claim 3, wherein the leading edge is configured to bisect the flow of sealant injected through the inlet hole.

5. The cap of claim 4, wherein the annular skirt surrounds a cap axis and the inlet hole has a centre axis lying on a radially extending plane from the cap axis, and wherein the leading edge is on the radially extending plane.

6. The cap of claim 3, wherein the leading edge extends to the inlet hole.

7. The cap of claim 3, wherein a lower end of the protuberance comprises a chamfer extending from the leading edge to proximal the base rim.

8. The cap of claim 7, wherein the chamfer is below the inlet hole.

9. The cap of claim 1, comprising an outlet in the skirt, wherein the outlet is in fluid communication with the annular pocket.

10. The cap of claim 1, wherein the base rim lies in the base rim plane around the full circumference of the skirt.

11. A cap for forming a sealed cavity around an end of a fastener, the cap comprising:
    a cap body with an annular base terminating at a base rim which surrounds an opening into a central cavity and lies in a base rim plane around all or a majority of its circumference;
    an annular skirt providing an annular pocket between the skirt and the base, the annular skirt extending from the cap body and terminating at a skirt rim;
    an inlet hole in the skirt, wherein the inlet hole is in fluid communication with the annular pocket to permit a flow of sealing material through the skirt via the inlet hole into the pocket; and
    an outlet in the skirt, wherein the outlet is in fluid communication with the pocket and arranged to enable air to escape the annular pocket through the skirt via the outlet as the sealing material flows from the inlet hole into the pocket;
wherein the skirt is spaced from the base rim plane around all or a majority of a circumference of the skirt so that there is an offset from the base rim plane to define a gap between the skirt rim and the base rim plane, and wherein the offset is between 0.05 mm and 0.35 mm.

12. The cap of claim 11, wherein the skirt is spaced from the base rim plane around the full circumference of the skirt.

13. The cap of claim 11, wherein the skirt rim lies parallel to the base rim plane around at least a majority of its circumference.

14. The cap of claim 11, wherein the skirt terminating at the skirt rim and the cap body are integrally formed from the same material.

15. The cap of claim 11, wherein the annular skirt surrounds a cap axis, and the inlet hole and outlet are positioned on opposite sides of the cap axis.

16. A joint, comprising:
    a structure;
    an end of a fastener protruding from the structure; and
    a cap forming a sealed cavity around the end of the fastener,
the cap comprising:
    a cap body with an annular base terminating at a base rim which surrounds an opening into a central cavity;

an annular skirt providing an annular pocket between the skirt and the base, wherein the annular skirt extends from an outboard end where it meets the cap body to an inboard skirt rim;

an inlet hole in the skirt; and a protuberance protruding in the annular pocket and facing the inlet hole, wherein the cap comprises a cured sealing material in the annular pocket which secures the cap to the structure.

17. The joint of claim 16, wherein the skirt rim is spaced from the structure around its full circumference.

18. A method of assembling the joint of claim 16, the method comprising:

fitting the cap over the end of the fastener; and injecting sealing material through the skirt via the inlet hole into the annular pocket.

19. A joint, comprising:

a structure;

an end of a fastener protruding from the structure; and a cap forming a sealed cavity around the end of the fastener, the cap comprising:

a cap body with an annular base terminating at a base rim which surrounds an opening into a central cavity and lies in a base rim plane around all or a majority of its circumference;

an annular skirt providing an annular pocket between the skirt and the base, the annular skirt extending from the cap body and terminating at a skirt rim;

an inlet hole in the skirt; and an outlet in the skirt;

wherein the skirt is spaced from the base rim plane around all or a majority of a circumference of the skirt so that there is an offset from the base rim plane to define a gap between the skirt rim and the base rim plane;

wherein the cap comprises a cured sealing material in the annular pocket which secures the cap to the structure; and wherein the offset is between 0.05 mm and 0.35 mm.

* * * * *